(12) United States Patent
Zimmer et al.

(10) Patent No.: US 9,495,177 B2
(45) Date of Patent: Nov. 15, 2016

(54) TECHNIQUES FOR PRE-OS IMAGE REWRITING TO PROVIDE CROSS-ARCHITECTURE SUPPORT, SECURITY INTROSPECTION, AND PERFORMANCE OPTIMIZATION

(71) Applicant: Intel Corporation, Santa Clara, CA (US)

(72) Inventors: Vincent J. Zimmer, Federal way, WA (US); Michael A. Rothman, Puyallup, WA (US); Robert B. Bahnsen, Tacoma, WA (US); Robert C. Swanson, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 6 days.

(21) Appl. No.: 14/126,886

(22) PCT Filed: Oct. 24, 2013

(86) PCT No.: PCT/US2013/066608
§ 371 (c)(1),
(2) Date: Dec. 17, 2013

(87) PCT Pub. No.: WO2015/060853
PCT Pub. Date: Apr. 30, 2015

(65) Prior Publication Data
US 2015/0212828 A1    Jul. 30, 2015

(51) Int. Cl.
| G06F 9/22 | (2006.01) |
| G06F 9/445 | (2006.01) |
| G06F 9/24 | (2006.01) |
| G06F 21/57 | (2013.01) |

(52) U.S. Cl.
CPC ............ *G06F 9/445* (2013.01); *G06F 8/65* (2013.01); *G06F 9/22* (2013.01); *G06F 9/24* (2013.01); *G06F 21/572* (2013.01); *G06F 2221/033* (2013.01)

(58) Field of Classification Search
CPC .. G06F 9/44502; G06F 9/44508; G06F 1/24; G06F 9/44526; G06F 15/177; G06F 9/44514; G06F 9/44523; G06F 11/1417; G06F 9/44505

See application file for complete search history.

(56) References Cited

U.S. PATENT DOCUMENTS

| 6,081,890 | A  * | 6/2000 | Datta | ................ | G06F 9/45504 703/27 |
| 7,610,433 | B2 * | 10/2009 | Randell | ............... | G06F 11/1068 710/22 |

(Continued)

FOREIGN PATENT DOCUMENTS

EP    2 362 312 A1    8/2011

OTHER PUBLICATIONS

International Search Report and Written Opinion received for PCT Patent Application No. PCT/US2013/066608, mailed on Jun. 27, 2014, 11 pages.

(Continued)

*Primary Examiner* — Zahid Choudhury
(74) *Attorney, Agent, or Firm* — Alpine Technology Law Group LLC

(57) ABSTRACT

Methods and apparatus relating to pre-OS (pre Operating System) image rewriting to provide cross-architecture support, security introspection, and/or performance optimization are described. In an embodiment, logic rewrites a non-native firmware interface driver into a native firmware interface driver in response to a determination that sufficient space is available in an integrity cache storage device to store the native firmware interface driver. The logic rewrites the non-native firmware interface driver into the native firmware interface driver by performing one or more of its operations during operating system runtime. Other embodiments are also claimed and described.

25 Claims, 6 Drawing Sheets

(56) References Cited

U.S. PATENT DOCUMENTS

| | | | |
|---|---|---|---|
| 2004/0268107 A1* | 12/2004 | Zimmer | G06F 9/4411 713/1 |
| 2005/0076196 A1 | 4/2005 | Zimmer et al. | |
| 2007/0169098 A1 | 7/2007 | Kikuchi | |
| 2008/0270685 A1 | 10/2008 | Kato | |
| 2013/0318604 A1* | 11/2013 | Coates | H04L 63/1416 726/22 |
| 2014/0033187 A1* | 1/2014 | Beale | G06F 8/67 717/168 |

OTHER PUBLICATIONS

Kumar, et al. "A Short Guide on Arm Exploitation", paper, Feb. 13, 2013, 57 pages.

Hallade, Xavier, "Android on Intel Course Native Applications with the NDK", Academic Presentation, Feb. 8, 2013, 44 pages, Intel Software.

Chernoff, et al., "Digital FX!32 Running 32-Bit x86 Applications on Alpha NT", paper, Aug. 1997, 8 pages, Proceedings of the USENIX Windows NT Workshop, Seattle, WA.

"Intel Platform Innovation Framework for EFI Compatibility Support Module Specification", specification, Apr. 18, 2006, 181 pages, Intel Corporation.

Blem, et al., "A Detailed Analysis of Contemporary ARM and x86 Architectures", paper, 2013, 17 pages, 19th IEEE International Symposium on High Performance Computer Architecture.

Victoria-Zhislina "From ARM NEON to Intel MMX&SSE—the automatic porting solution, tips and tricks", Internet blog post, Dec. 12, 2012, 3 pages, retrieved from https://software.intel.com/en-us/blogs/2012/12/12/from-arm-neon-to-intel-mmxsse-automatic-porting-solution-tips-and-tricks.

* cited by examiner

TECHNIQUES FOR PRE-OS IMAGE REWRITING TO PROVIDE CROSS-ARCHITECTURE SUPPORT, SECURITY INTROSPECTION, AND PERFORMANCE OPTIMIZATION

FIELD

The present disclosure generally relates to the field of computing. More particularly, an embodiment generally relates to pre-OS (pre Operating System) image rewriting to provide cross-architecture support, security introspection, and/or performance optimization.

BACKGROUND

Secure loading and/or updating of firmware is an important process for computing devices to ensure that only the authorized firmware and/or software is executed on a platform.

In some systems, the UEFI (Unified Extensible Firmware Interface) specification provides for a unified firmware-based booting interface across several Operating System (OS) environments. However, UEFI binary platform binding is generally available for a limited number of platforms. Accordingly, more flexibility is required in implementation of firmware loading and/or updating on various computing platforms.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
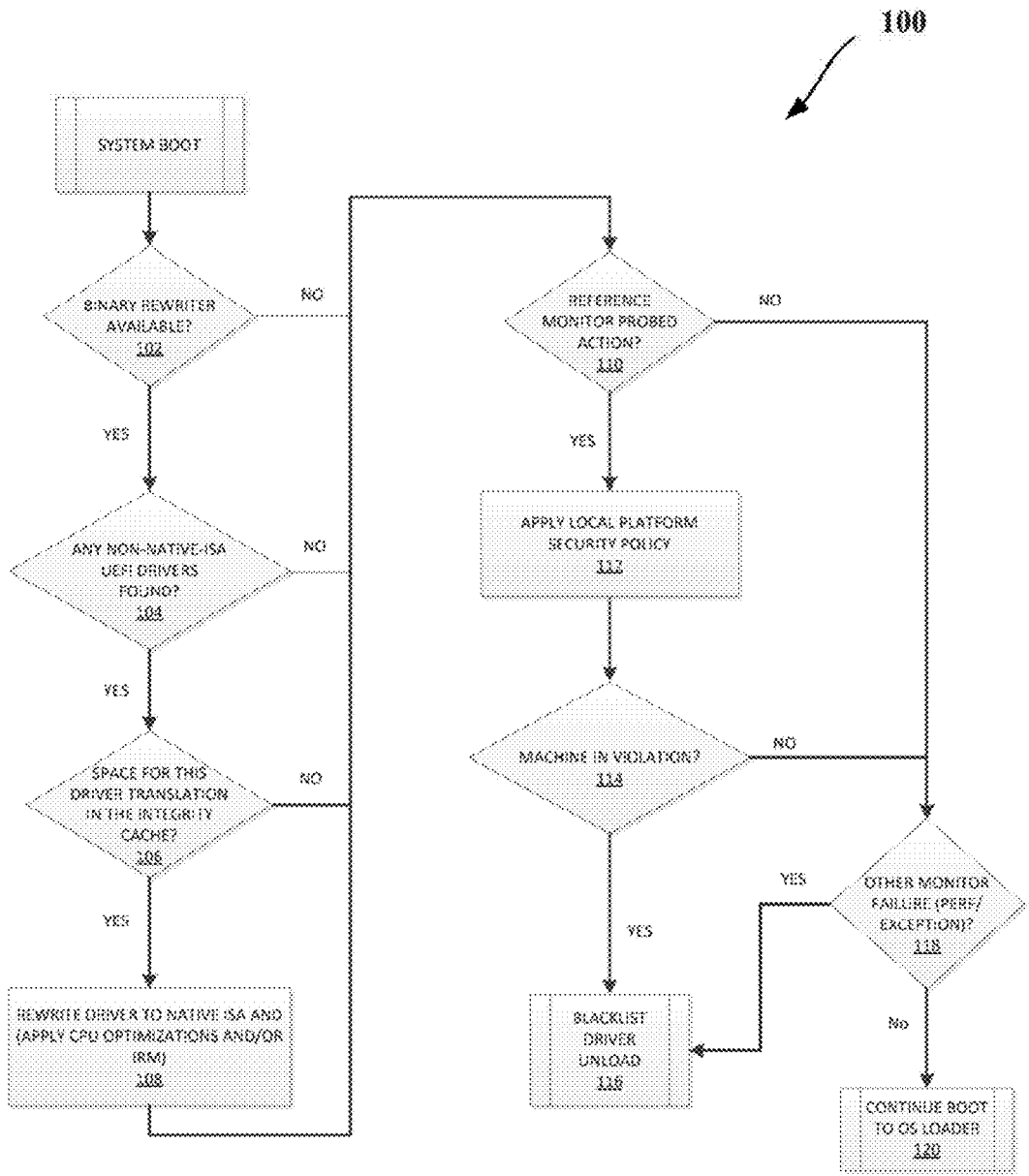
FIG. 1 shows a flow diagram of a method for a binary translator during a boot flow, according to an embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one tar more programs ("software"), or some combination of hardware and software. For the purposes of this disclosure reference to "logic" shall mean either hardware, software, firmware (FM), or some combination thereof.

Some embodiments rewrite pre-OS (pre operating System) image(s) to provide cross-architecture support, security introspection, and/or performance optimization. For example, some embodiments can greatly improve firmware update process safety as well as efficiency. Moreover, various embodiments can significantly reduce system failure risk during firmware update. Mare particularly, an embodiment addresses the issue of having native execution mode binaries for various UEFI binary platform bindings (including, for example, 32-bit or 64-bit architectures). For example, one embodiment provides mutability of executables for purpose of Application Binary Interface (ABI) portability, security, and/or performance.

Generally, firmware loading and/or maintenance is an important process for computing devices including mobile devices (such as phones, tablets, UMPC (Ultra-Mobile Personal Computer), laptop computers, ultrabooks, smart watches, smart glasses, etc.) to ensure that only the authorized firmware and/or software is loaded and/or updated on the platform (e.g., via BIOS (Basic Input Output System) and/or OS). In some systems, the UEFI (Unified Extensible Firmware Interface) specification provides fix an interface between several types of Operating Systems and platform firmware. Moreover, in UEFI, there is as concept of a portable executable in the form of the EFI (Extensible Firmware Interface) Byte Code (EBC). This allows for cross-platform usage between for example Itanium® and IA-32. Since the inception of EBC in 2001, EFI has become UEFI and x64 and ARM® 32-bit have been added as supported bindings. However, there are some size issues with the EBC interpreter and most Independent Hardware Vendors (IHV's) have opted to compile for the volume UEFI platform; namely, the x64 UEFI binding found in Windows®8 class of personal computers. This is a problem for some manufacturers and system providers as UEFI has been unable to deliver true cross-platform binding for the various OS environments in use.

Some embodiments introduce one or more elements into the boot flow of a computing system. These elements may include a binary translator and an integrity cache. In an embodiment, the binary translator is written in the native Instruction Set Architecture (referred to as ISA-Native) of the platform being booted. The binary translator may map alternate CPU (Central Processing Unit) binaries (also referred to as ISA-Non-Native) into ISA-Native or map a generic ISA-Native into an optimized binary that uses specific CPU features (e.g., AVX3), with the latter being ISA-Native-Optimized.

The rewriter/binary translator may be executed on a training boot when the platform is booted for the first time, or it may be run in promiscuous mode during boot behind a timed SMI (System Management Interrupt) or another interrupt, or at runtime behind a timed SMI, or it may run on a spare core (e.g., since UEFI is single threaded, there is generally more than 1 logical CPU available for this class of concurrent activity). Once the binary code has been rewritten (e.g., from ISA-Non-Native to ISA-Native), it is stored in the integrity cache. With connected standby, there is not a need to move the content of the integrity cache to persistent memory, but in some deeper sleep states (e.g., C-9), the integrity cache could be lost. To this end, some embodiments may move or copy the content of the integrity cache to persistent/non-volatile memory. Moreover, some embodiments offload the integrity cache content into persistent memory (also referred to a non-volatile memory or NVM), e.g., fast on-package memory. In various embodiments, the NVM or persistent memory devices discussed herein include flash memory, Spin Torque Transfer Random Access Memory (STTRAM), Resistive Random Access Memory, 3D (3-Dimensional) Cross Point Memory such as Phase Change Memory (PCM), etc. In an embodiment, this offloading is performed via SXP memory on a client (e.g., when embedded into the south complex (PCH or Peripheral Control Hub) and SXP DIMMs (Dual Inline Memory Modules) off the memory controller on the server systems. Without loss of generality, the integrity cache could also be copied to alternative persistent memory.

In one embodiment, the integrity cache is as secure storage device on the platform, where the hash of the original executable and the instance of the rewritten binary code are stored. This is necessary in some implementations because the platform needs to also support contemporary features like Trusted Computing Group (TCG), Measured Boot, and UEFI 2.3.1c Secure Boot. In the case of these latter two features, there is some policy applied to the platform that needs the hash or fingerprint of the executable. The signing actions and binaries will typically be based upon ISA-Non-Native, not the rewritten binary in ISA-Native. So both verisimilitude to the original codes and protection of the rewritten binaries are to be enforced.

FIG. 1 shows as flow diagram of a method 100 for a binary translator during a boot flow, according to an embodiment. In some embodiments, one or more components of the remaining figures (such as one or more processor cores, binary rewriter/translator logic/code, and/or integrity cache) perform one or more operations of FIG. 1.

Referring to FIG. 1, during system boot, it is determined whether a binary rewriter module/logic/code is available at an operation 102. If the rewriter is available (such as item 214 of FIG. 2), at an operation 104, it is determined whether any non-native-ISA UEFI drivers are found on the platform (e.g., stored in storage device discussed with reference to FIGS. 4-6). If a driver is found, at an operation 106, it is determined whether space is available in the integrity cache (such as the cache 202 of FIG. 2) for translation of the found driver of operation 104. If space is available in the integrity cache, at an operation 108, the driver is rewritten to native ISA. In some embodiments, CPU-specific optimization(s) and/or IRM(s) (Inline Reference Monitor(s)) are also applied at operation 108. For example, an IRM would assess each operation against as security policy of the platform, e.g., to determine if an I/O operation is permitted by the given executable or the memory range is accessible.

As shown in FIG. 1, if determinations at operations 102-106 are negative or after operation 108, method 100 continues with the boot process. At an operation 110, it is determined whether a probed action exists, e.g., as detected by a reference monitor module (such as the reference module 212 of FIG. 2). If so, an operation 112 applies any local platform security policy. At an operation 114, it is determined whether violation (e.g., of the platform security policy) has occurred. If so, the driver is blacklisted (e.g., identified or marked as a policy violator) and unloaded at an operation 116. Otherwise, if determinations at operations 110 or 114 are negative, at an operation 118, it is determined whether another monitor failure has occurred (such as an exception or PERF (referring to "performance," e.g., since boot time of firmware is critical, excessive latency or time in an operation is a condition which can be flagged and logged)). If so, method 100 resumes at operation 116; otherwise, the boot is continued with the OS loader at an operation 120.

Figure 2:
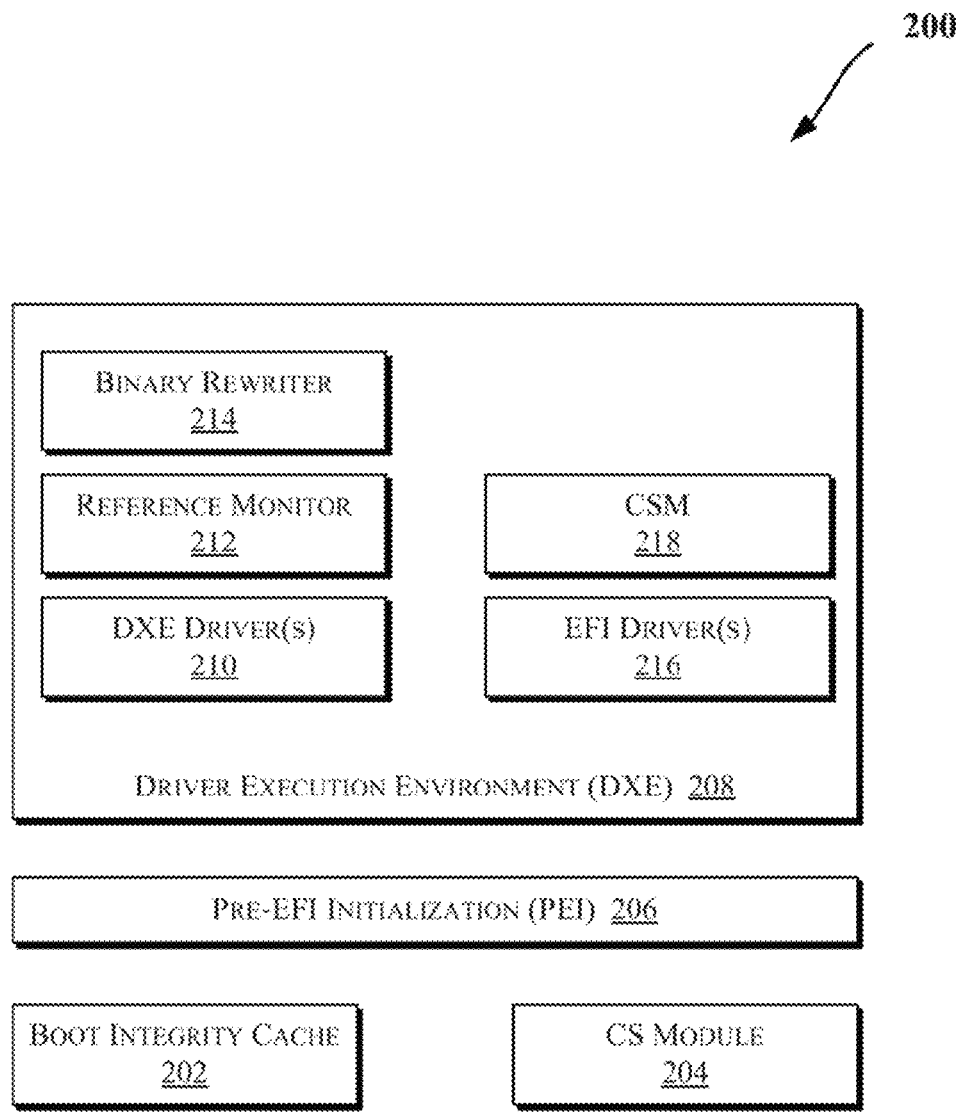
FIG. 2 illustrates a block diagram of an architecture for the binary translator and the integrity cache in a computing platform, according to an embodiment.

FIG. 2 illustrates a block diagram of an architecture for the binary translator and the integrity cache in a computing platform 200, according to an embodiment. As shown, the platform includes the boot integrity cache 202, a CS (chipset) module 204, a pre-EFI initialization (PEI) module 206, and/or a Driver Execution Environment (DXE) 208.

The DXE 208 may include one or more DXE drivers 210, a reference monitor module 212 (e.g., that monitors or detects one or more probed actions), a binary rewriter/translator 214 (such as discussed herein), one or more EFI drivers 216, and/or CSM (or Compatibility Support Module, which encapsulates PC/AT legacy BIOS boot behavior) 218.

Figure 3:
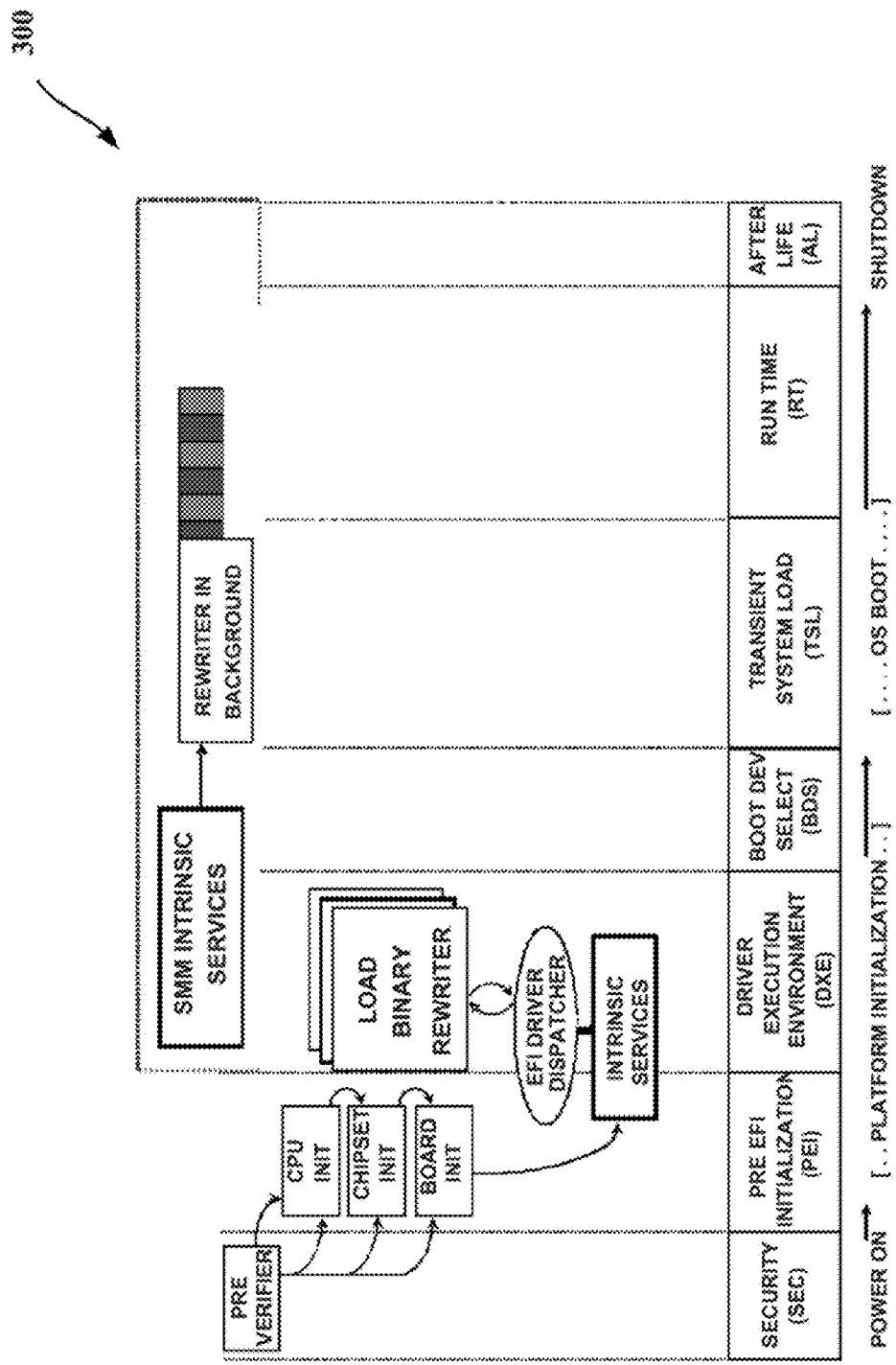
FIG. 3 provides a temporal view of a boot flow, according to an embodiment.

FIG. 3 provides a temporal view of a boot flow 300, according to an embodiment. More specifically, FIG. 3 shows the binary translator (e.g., item 214 of FIG. 2) performing its rewriting operations in the background during the OS runtime, according to an embodiment.

As shown in FIG. 3, at power on, a pre-verifier causes verification of the CPU, chipset, and hoard initialization during PEI. The binary rewriter module 214 is loaded in DXE during platform initialization, e.g., by an EFI driver dispatcher module. During platform initialization, the EFI driver dispatcher may also initiate intrinsic services (such as the DXE Services (version 2 of the UEFI Platform Specification available through www.uefi.org) and SMM (System Management Mode—version 2.4 of the aforementioned Platform Initialization Specification) intrinsic services. As shown in FIG. 3, the binary translator (e.g., item 214 of FIG. 2) performs its task(s) (e.g., its successive rewriting operations) in the background during the OS runtime. Accordingly, some embodiments will allow for provision of cross-platform support, as well as boot-time performance tuning and security. The latter security can include Inline Reference Monitors (IRM's), e.g., which may be similar to dynamic checks or asserts. Generally, IRM-like logic is ignored because different platforms have alternate security models. The ability to generate the code on-the-fly allows for IRM's that can map to many security models, such as Mandatory Access Control (MAC).

Some embodiments could also be used to address some of the other compatibility concerns in moving to UEFI; namely, the prevalence of 16-bit PC/AT option ROM binaries. Some embodiments binary translate a 16-bit option ROM into an ISA native UEFI driver for the target architecture. The Int-call interface, such as Int13h for disk, maps to the UEFI API's, such as EFI_BLOCK_IO_PROTOCOL, and basic blocks in a 16-bit option ROM like out dx, al map to the more stylized UEFI calls such as PciIoProtocol.Io.Write, for example.

By contrast, today there is no binary translator. UEFI Platform firmware has a simple image loader which copies an image into memory, applies fix-ups, and passes control to the image's entry point. Additionally, the storing and protection of the BT (Binary Translated) image integrity cache is not present. Furthermore, some embodiments can also store the derived programming values and SPD for chipset settings (where "SPD" refers to Serial Presence Detect, which may include (e.g., a relatively small) EEPROM (Electrically Erasable Programmable Read-Only Memory) on a DRAM (Dynamic Random Access Memory) board that stores memory settings and may be read, e.g., by the firmware via SMBUS (System Management Bus)).

Figure 4:
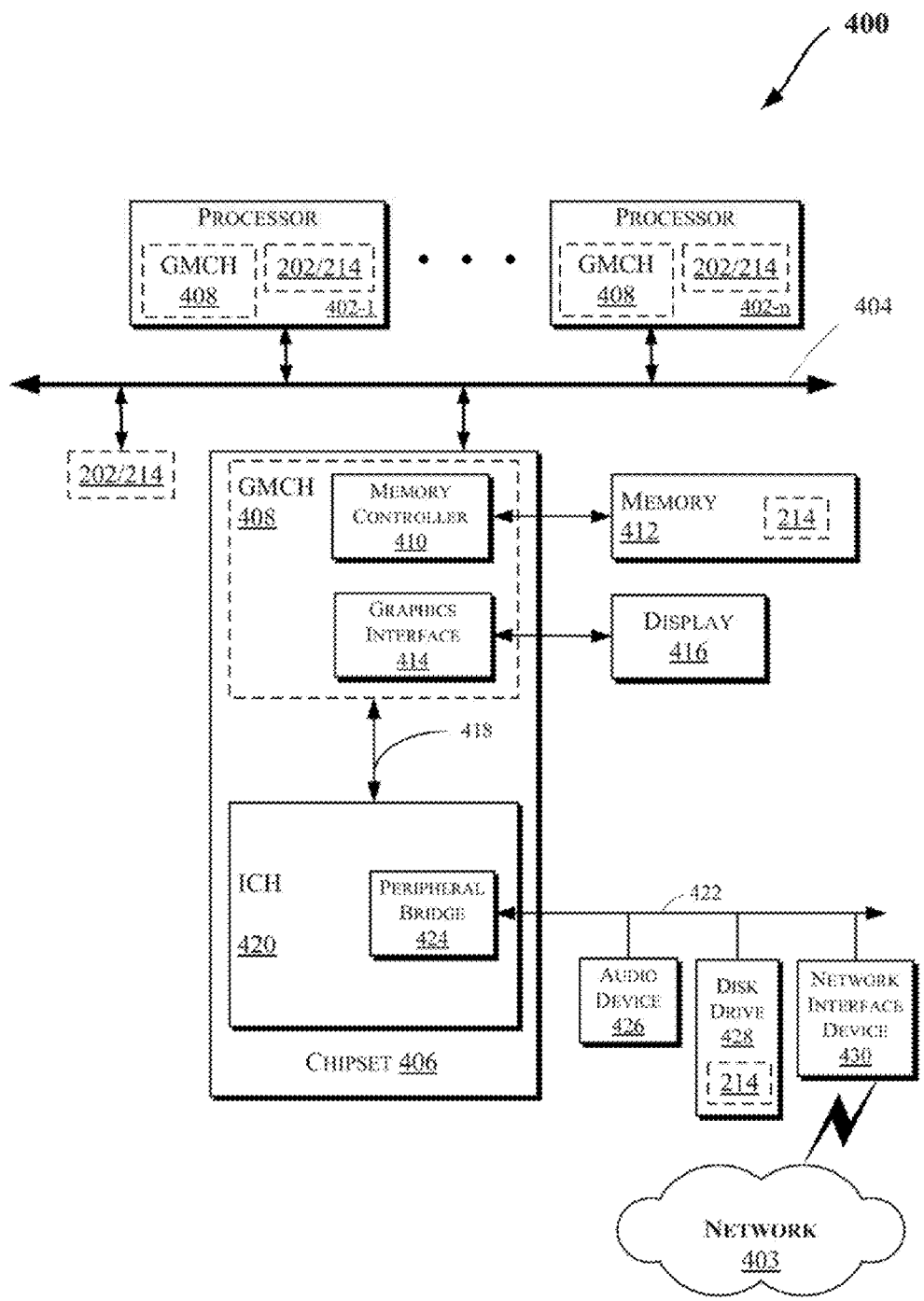
FIGS. 4-6 illustrate block diagrams of embodiments of computing systems, which may be utilized to implement some embodiments discussed herein.

FIG. 4 illustrates at block diagram of a computing system 400 in accordance with an embodiment. The computing system 400 may include one or more central processing unit(s) (CPUs) 402 or processors that communicate via an interconnection network (or bus) 404. The processors 402 may include a general purpose processor, a network processor (that processes data communicated over a computer network 403), or other types of a processor (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors. In an embodiment, one or more of the processors 402 may be the same or similar to the processors discussed with reference to previous figures. For example, one or more components of system 400 may include the boot integrity cache 202 and/or binary rewriter/translator logic 214 (such as shown in FIG. 4) or other components discussed with reference to FIGS. 1-3. Also, the operations discussed with reference to FIGS. 1-3 may be performed by one or more components of the system 400.

A chipset 406 may also communicate with the interconnection network 404. The chipset 406 may include a Graphics and Memory Control Hub (GMCH) 408. The GMCH 408 may include a memory controller 410 that communicates with a memory 412. The memory 412 may store data, including sequences of instructions, that may be executed by the CPU 402, or any other device included in the computing system 400. In one embodiment, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

The GMCH 408 may also include a graphics interface 414 that communicates with a display device 416. In one embodiment, the graphics interface 414 may communicate with the display device 416 via an accelerated graphics port (AGP) or Peripheral Component Interconnect (PCI) (or PCI express (PCIe) interface). In an embodiment, the display 416 (such as a flat panel display) may communicate with the graphics interface 414 through, for example, a signal converter that translates a digital representation of an image stored in a storage device such as video memory or system memory into display signals that are interpreted and displayed by the display 416. The display signals produced by the display device may pass through various control devices before being interpreted by and subsequently displayed on the display 416.

A hub interface 418 may allow the GMCH 408 and an input/output control hub (ICH) 420 to communicate. The ICH 420 may provide an interface to I/O device(s) that communicate with the computing system 400. The ICH 420 may communicate with a bus 422 through as peripheral bridge (or controller) 424, such as a peripheral component interconnect (PCI) bridge, a universal serial bus (USB) controller, or other types of peripheral bridges or controllers. The bridge 424 may provide a data path between the CPU 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices. The bus 422 may communicate with an audio device 426, one or more disk drive(s) 428, and a network interface device 430 (which is in communication with the computer network 403). Other devices may communicate via the bus 422. Also, various components (such as the network interface device 430) may communicate with the GMCH 408 in some embodiments. In addition, the processor 402 and the GMCH 408 may be combined to form a single chip and/or a portion or the whole of the GMCH 408 may be included in the processors 402 (instead of inclusion of GMCH 408 in the chipset 406, for example). Furthermore, the graphics accelerator 416 may be included within the GMCH 408 in other embodiments.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 400 may be arranged in a point-to-point (PtP) configuration such as discussed with reference to FIG. 5. For example, processors, memory, and/or input/output devices may be interconnected by a number of point-to-point interfaces.

Figure 5:
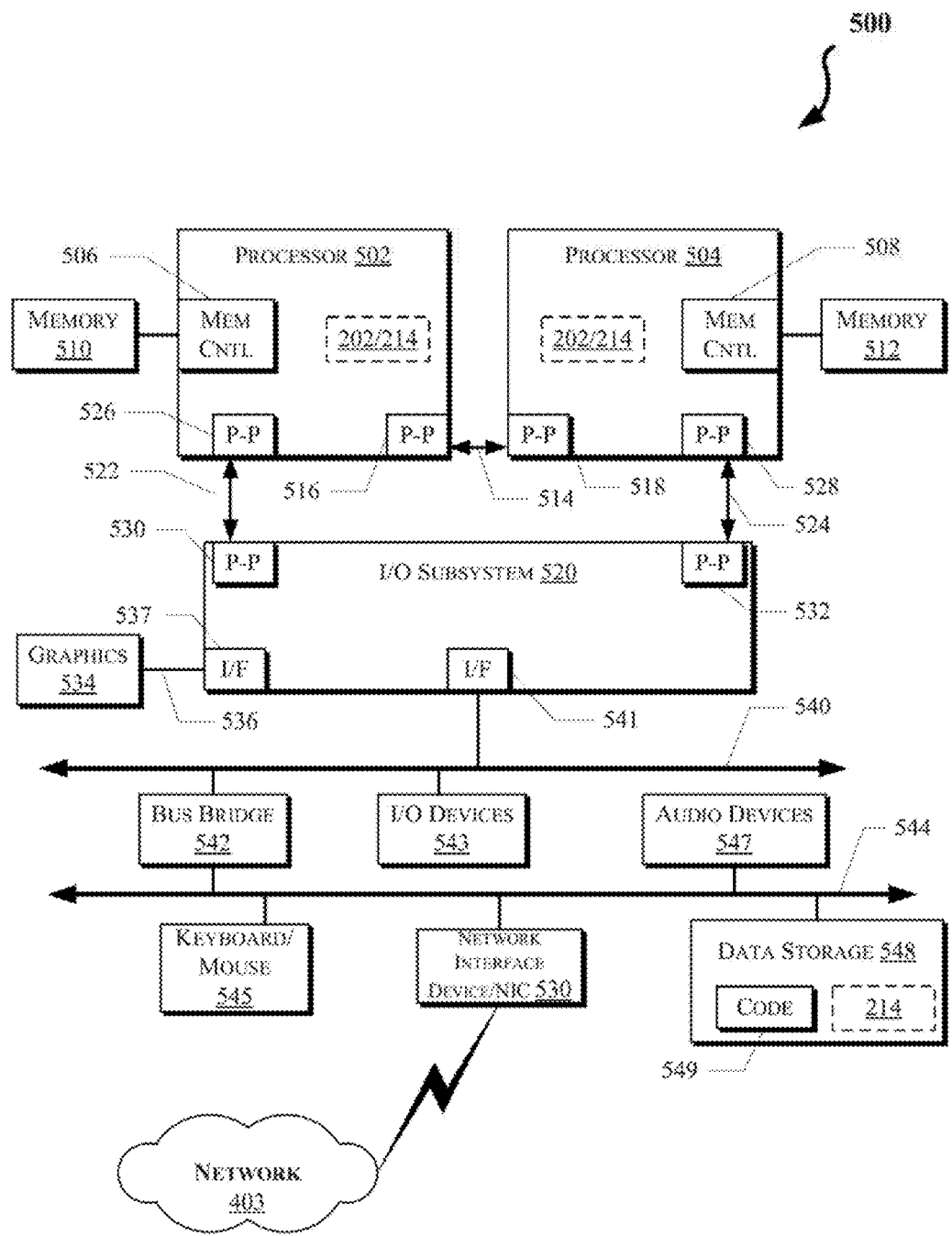

More specifically, FIG. 5 illustrates a computing system 500 that is arranged in a point-to-point (PtP) configuration, according to an embodiment. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 412 of FIG. 4.

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a graphics circuit 534 via a graphics interface 536, e.g., using a PtP interface circuit 537.

At least one embodiment may be provided within the processors 502 and 504. For example, one or more components of system 500 may include the boot integrity cache 202 and/or binary rewriter/translator 214 (such as shown in FIG. 5) or other components discussed with reference to FIGS. 1-4. Also, the operations discussed with reference to FIGS. 1-4 may be performed by one or more components of the system 500. Also, the rewriter/translator 214 may be stored in memory 510 or 512. Other embodiments, however, may exist in other circuits, logic units, or devices within the system 500 of FIG. 5. Furthermore, other embodiments may be distributed throughout several circuits, logic units, or devices illustrated in FIG. 5.

The chipset 520 may communicate with a bus 540 using a PtP interface circuit 541. The bus 540 may communicate with one or more devices, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 403), audio I/O device 547, and/or a data storage device 548. The data storage device 548 may store code 549 that may be executed by the processors 502 and/or 504.

Figure 6:
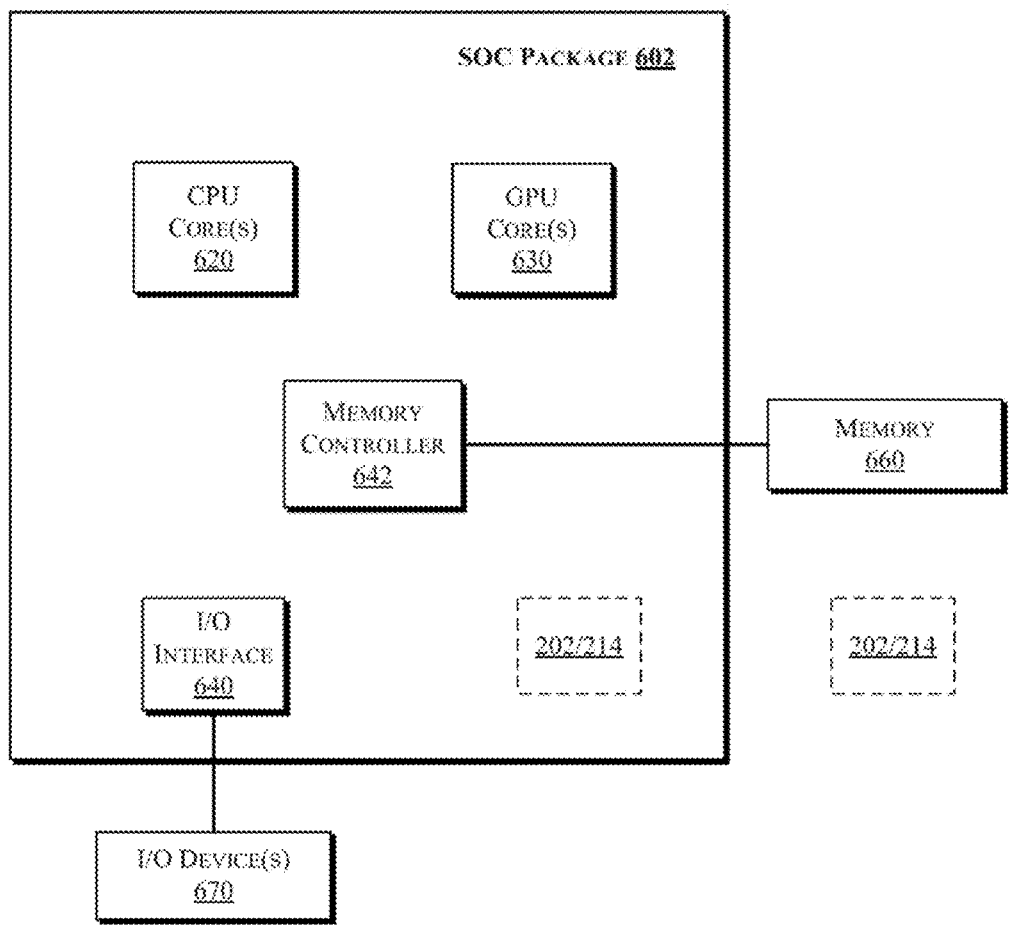

In some embodiments, one or more of the components discussed herein can be embodied as a System On Chip (SOC) device. FIG. 6 illustrates a block diagram of an SOC package in accordance with an embodiment. As illustrated in FIG. 6, SOC 602 includes one or more Central Processing Unit (CPU) cores 620, one or more Graphics Processor Unit (CPU) cores 630, an Input/Output (I/O) interface 640, and a memory controller 642. Various components of the SOC package 602 may be coupled to an interconnect or bus such as discussed herein with reference to the other figures. Also, the SOC package 602 may include more or less components, such as those discussed herein with reference to the other figures. Further, each component of the SOC package 620 may include one or more other components, e.g., as discussed with reference to the other figures herein. In one embodiment, SOC package 602 (and its components) is provided on one or more Integrated Circuit (IC) die, e.g., which are packaged into a single semiconductor device.

As illustrated in FIG. 6, SOC package 602 is coupled to a memory 660 (which may be similar to or the same as memory discussed herein with reference to the other figures) via the memory controller 642. In an embodiment, the memory 660 (or a portion of it) can be integrated on the SOC package 602.

The I/O interface 640 may be coupled to one or more I/O devices 670, e.g., via an interconnect and/or bus such as discussed herein with reference to other figures. I/O device(s) 670 may include one or more of a keyboard, a mouse, a touchpad, a display, an image/video capture device (such as a camera or camcorder/video recorder), a touch screen, a speaker, or the like. Furthermore, SOC package 602 may include/integrate the integrity cache 202 and/or binary rewriter logic/code/module 214 in an embodiment. Alternatively, one or more of items 202 or 214 may be provided outside of the SOC package 602 (i.e., as a discrete logic/cache).

The following examples pertain to further embodiments. Example 1 includes an apparatus comprising: a storage device to store a non-native firmware interface driver; and logic to rewrite the non-native firmware interface driver into it native firmware interface driver in response to a determination that sufficient space is available in an integrity cache storage device to store the native firmware interface driver, wherein logic to rewrite the non-native firmware interface driver into the native firmware interface driver is to perform one or more of its operations during an operating system runtime. Example 2 includes the apparatus of example 1, wherein the native firmware interface driver is to be blacklisted in response to detection of one of: a security policy violation or an exception. Example 3 includes the apparatus of example 1, comprising logic to apply one or more processor-specific optimizations to the native firmware interface driver. Example 4 includes the apparatus of example 1, comprising logic to apply one or more Inline Reference Monitors to the native firmware interface driver. Example 5 includes the apparatus of example 1, comprising logic to apply a local platform security policy to the native firmware interface driver. Example 6 includes the apparatus of example comprising logic to apply a local platform security policy to the native firmware interface driver in response to occurrence of a monitored action. Example 7 includes the apparatus of example 1, wherein the logic to rewrite the non-native firmware interface driver into the native firmware interface driver is to start the one or more of its operations in as driver execution environment. Example 8 includes the apparatus of example 1, wherein the logic to rewrite the non-native firmware interface driver into the native firmware interface driver is to start the one or more of its operations in the driver execution environment and during platform initialization. Example 9 includes the apparatus of example 1, wherein logic to rewrite the non-native firmware interface driver into the native firmware interface driver is to perform the one or more of its operations during the operating system runtime and in the background. Example 10 includes the apparatus of example 1, wherein the non-native firmware interface driver is to comprise a driver in accordance with a Unified Extensible Firmware Interface (UEFI). Example 11 includes the apparatus of any of examples 1 to 10, wherein the storage device, the logic, and one or more processor cores are on a single integrated circuit device.

Example 12 includes a method comprising: storing a non-native firmware interface driver in a storage device; and rewriting the non-native firmware interface driver into a native firmware interface driver in response to a determination that sufficient space is available in an integrity cache storage device to store the native firmware interface driver, wherein rewriting the non-native firmware interface driver into the native firmware interface driver comprises one or more operations that are performed during an operating system runtime. Example 13 includes the method of example 12, further comprising blacklisting the native firmware interface driver in response to detection of ore of a security policy violation or an exception. Example 14 includes the method a example 12, further comprising applying one or more processor-specific optimizations to the native firmware interface driver. Example 15 includes the method of example 12, further comprising applying one or more Inline Reference Monitors to the native firmware interface driver. Example 16 includes the method of example 12, further comprising applying a local platform security policy to the native firmware interface driver in response to occurrence of a monitored action. Example 17 includes the method of example 12, wherein rewriting the non-native firmware interface driver into the native firmware interface driver comprises starting the one or more operations in a driver execution environment. Example 18 includes the method of example 12, wherein rewriting the non-native firmware interface driver into the native firmware interface driver comprises starting the one or more operations in the driver execution environment and during platform initialization. Example 19 includes the method of example 12, wherein rewriting the non-native firmware interface driver into the native firmware interface driver composes performing the one or more operations during the operating system runtime and in the background. Example 20 includes the method of example 12, wherein the non-native, firmware interface driver comprises a driver in accordance with a Unified Extensible Firmware Interface (UEFI).

Example 21 includes a computing system comprising: one or more processor cores; memory, coupled to at least one of the processor cores, to store a non-native firmware interface driver; and logic to rewrite the non-native firmware interface driver into a native firmware interface driver in response to a determination that sufficient space is available in an integrity cache storage device to store the native firmware interface driver, wherein logic to rewrite the non-native firmware interface driver into the native firmware interface driver is to perform one or more of its operations during an operating system runtime. Example 22 includes the system of example 21, wherein the native firmware interface driver is to be blacklisted in response to detection of one of: a security policy violation or an exception. Example 23 includes the system of example 21, comprising logic to apply one or more processor-specific optimizations to the native firmware interface driver.

Example 24 includes a computer-readable medium comprising one or more instructions that when executed on a processor configure the processor to perform one or more operations according to any of examples 12 to 21. Example 25 includes an apparatus comprising means to perform a method as set forth in any of examples 12 to 21. Example 26 includes at computer-readable medium comprising one or more instructions that when executed on a processor configure the processor to perform one or more operations to: to store a non-native firmware interface driver in a storage device; and to rewrite the non-native firmware interface driver into a native firmware interface driver in response to a determination that sufficient space is available in an integrity cache storage device to store the native firmware interface driver, wherein rewriting the non-native firmware interface driver into the native firmware interface driver comprises one or more operations that are performed during an operating system runtime. Example 27 includes the computer-readable medium of example 26, further comprising one or more instructions that when executed on the processor configure the processor to perform one or more operations to cause blacklisting of the native firmware interface driver in response to detection of one of: a security policy violation or an exception. Example 28 includes the computer-readable medium of example 26, further comprising one or more instructions that when executed on the processor configure the processor to perform one or more operations to cause an application of one or more processor-specific optimizations to the native firmware interface driver. Example 29 includes the computer-readable medium of example 26, further comprising one or more instructions that when executed on the processor configure the processor to perform one or more operations to cause application of one or more Inline Reference Monitors to the native firmware interface driver. Example 30 includes the computer-readable medium of example 26, further comprising one or more instructions that when executed on the processor configure the processor to perform one or more operations to cause application of a local platform security policy to the native firmware interface driver in response to occurrence of a monitored action. Example 31 includes the computer-readable medium of example 26, wherein rewriting the non-native firmware interface driver into the native firmware interface driver comprises starting the one or more operations in a driver execution environment. Example 32 includes the computer-readable medium of example 26, further comprising one or more instructions that when executed on the processor configure the processor to perform one or more operations to cause rewriting of the non-native firmware interface driver into the native firmware interface driver comprises starting the one or more operations in the driver execution environment and during platform initialization. Example 33 includes the computer-readable medium of example 26, further comprising one or more instructions that when executed on the processor configure the processor to perform one or more operations to cause rewriting of the non-native firmware interface driver into the native firmware interface driver comprises performing the one or more operations during the operating system runtime and in the background. Example 34 includes the computer-readable medium of example 26, wherein the non-native firmware interface driver comprises a driver in accordance with a Unified Extensible Firmware Interface (UEFI).

In various embodiments, the operation discussed herein, e.g., with reference to FIGS. 1-6, may be implemented as hardware (e.g., logic circuitry), software, firmware, or combinations thereof, which may be provided as a computer program product, e.g., including a tangible (such as a non-transitory) machine-readable or computer-readable medium having stored thereon instructions (or software procedures) used to program a computer to perform a process discussed herein. The machine-readable medium may include a storage device such as those discussed with respect to FIGS. 1-6 (including, for example, ROM, RAM, flash memory, hard drive, solid state drive, etc.). Additionally, such computer-readable media may be downloaded as a computer program product, wherein the program may be transferred from as remote computer (e.g. server) to a requesting computer (e.g., a client) by way of data signals provided in as carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   a storage device to store a non-native firmware interface driver; and
   logic to rewrite the non-native firmware interface driver into a native firmware interface driver in response to a determination that sufficient space is available in an integrity cache storage device to store the native firmware interface driver to allow the integrity cache storage device to store both the native firmware interface driver and at least a hash of the non-native firmware interface driver,
   wherein logic to rewrite the non-native firmware interface driver into the native firmware interface driver is to perform one or more of its operations during an operating system runtime.

2. The apparatus of claim 1, wherein the native firmware interface driver is to be blacklisted in response to detection of one of: a security policy violation or an exception.

3. The apparatus of claim 1, comprising logic to apply one or more processor-specific optimizations to the native firmware interface driver.

4. The apparatus of claim 1, comprising logic to apply one or more Inline Reference Monitors to the native firmware interface driver.

5. The apparatus of claim 1, comprising logic to apply a local platform security policy to the native firmware interface driver.

6. The apparatus of claim 1, comprising logic to apply a local platform security policy to the native firmware interface driver in response to occurrence of a monitored action.

7. The apparatus of claim 1, wherein the logic to rewrite the non-native firmware interface driver into the native firmware interface driver is to start the one or more of its operations in a driver execution environment.

8. The apparatus of claim 1, wherein the logic to rewrite the non-native firmware interface driver into the native firmware interface driver is to start the one or more of its operations in the driver execution environment and during platform initialization.

9. The apparatus of claim 1, wherein logic to rewrite the non-native firmware interface driver into the native firmware interface driver is to perform the one or more of its operations during the operating system runtime and in the background.

10. The apparatus of claim 1, wherein the non-native firmware interface driver is to comprise a driver in accordance with a Unified Extensible Firmware Interface (UEFI).

11. The apparatus of claim 1, wherein the storage device, the logic, and one or more processor cores are on a single integrated circuit device.

12. A method comprising:
storing a non-native firmware interface driver in a storage device; and
rewriting the non-native firmware interface driver into a native firmware interface driver in response to a determination that sufficient space is available in an integrity cache storage device to store the native firmware interface driver to allow the integrity cache storage device to store both the native firmware interface driver and at least a hash of the non-native firmware interface driver,
wherein rewriting the non-native firmware interface driver into the native firmware interface driver comprises one or more operations that are performed during an operating system runtime.

13. The method of claim 12, further comprising blacklisting the native firmware interface driver in response to detection of one of: a security policy violation or an exception.

14. The method of claim 12, further comprising applying one or more processor-specific optimizations to the native firmware interface driver.

15. The method of claim 12, further comprising applying one or more Inline Reference Monitors to the native firmware interface driver.

16. The method of claim 12, further comprising applying a local platform security policy to the native firmware interface driver in response to occurrence of a monitored action.

17. The method of claim 12, wherein rewriting the non-native firmware interface driver into the native firmware interface driver comprises starting the one or more operations in a driver execution environment.

18. The method of claim 12, wherein rewriting the non-native firmware interface driver into the native firmware interface driver comprises starting the one or more operations in the driver execution environment and during platform initialization.

19. The method of claim 12, wherein rewriting the non-native firmware interface driver into the native firmware interface driver comprises performing the one or more operations during the operating system runtime and in the background.

20. The method of claim 12, wherein the non-native firmware interface driver comprises a driver in accordance with a Unified Extensible Firmware Interface (UEFI).

21. A non-transitory computer-readable medium comprising one or more instructions that when executed on a processor configure the processor to perform one or more operations to:
store a non-native firmware interface driver in a storage device; and
rewrite the non-native firmware interface driver into a native firmware interface driver in response to a determination that sufficient space is available in an integrity cache storage device to store the native firmware interface driver to allow the integrity cache storage device to store both the native firmware interface driver and at least a hash of the non-native firmware interface driver,
wherein rewriting the non-native firmware interface driver into the native firmware interface driver comprises one or more operations that are performed during an operating system runtime.

22. The computer-readable medium of claim 21, further comprising one or more instructions that when executed on the processor configure the processor to perform one or more operations to cause blacklisting of the native firmware interface driver in response to detection of one of: a security policy violation or an exception.

23. The computer-readable medium of claim 21, further comprising one or more instructions that when executed on the processor configure the processor to perform one or more operations to cause an application of one or more processor-specific optimizations to the native firmware interface driver.

24. The computer-readable medium of claim 21, further comprising one or more instructions that when executed on the processor configure the processor to perform one or more operations to cause application of one or more Inline Reference Monitors to the native firmware interface driver.

25. The computer-readable medium of claim 21, further comprising one or more instructions that when executed on the processor configure the processor to perform one or more operations to cause application of a local platform security policy to the native firmware interface driver in response to occurrence of a monitored action.

* * * * *